United States Patent
Donner et al.

(10) Patent No.: US 6,332,750 B1
(45) Date of Patent: Dec. 25, 2001

(54) METHOD AND APPARATUS FOR DEPALLETIZING COMMODITIES

(75) Inventors: Knut Donner, Hamburg; Hans-Jürgen Hoppe, Epenwöhrden; Uwe Keil, Schwarzenbek, all of (DE)

(73) Assignee: Topack Verpackungstechnik GmbH, Schwarzenbeck (DE)

( * ) Notice: Subject to any disclaimer, the term of this patent is extended or adjusted under 35 U.S.C. 154(b) by 0 days.

(21) Appl. No.: 08/974,389

(22) Filed: Nov. 19, 1997

(30) Foreign Application Priority Data

Dec. 21, 1996 (DE) .............................................. 196 53 953

(51) Int. Cl.⁷ .................................................. B65G 59/02
(52) U.S. Cl. .......................................... 414/796.9; 901/47
(58) Field of Search .............................. 414/792.9, 796.9; 901/47

(56) References Cited

U.S. PATENT DOCUMENTS

| | | | |
|---|---|---|---|
| 4,652,204 | * | 3/1987 | Arnett ................................. 901/47 X |
| 4,911,608 | * | 3/1990 | Krappitz et al. .............. 414/796.9 X |
| 4,993,915 | * | 2/1991 | Berger et al. ................. 414/792.9 X |
| 5,040,942 | | 8/1991 | Brinker et al. ......................... 414/796 |
| 5,102,292 | | 4/1992 | Brinker et al. ......................... 414/796 |
| 5,169,284 | * | 12/1992 | Berger et al. ................. 414/792.9 X |
| 5,193,973 | * | 3/1993 | Tübke ................................. 414/796.9 |
| 5,411,362 | * | 5/1995 | Neri et al. .......................... 414/796.9 |
| 5,783,834 | * | 7/1998 | Shatas ................................. 901/47 X |
| 5,813,819 | * | 9/1998 | Ohsawa et al. ..................... 901/47 X |

FOREIGN PATENT DOCUMENTS

| | | |
|---|---|---|
| 37 18601 A 1 | 12/1988 | (DE) . |
| 38 35 032 A 1 | 4/1990 | (DE) . |
| 195 18 256 A 1 | 11/1996 | (DE) . |
| 0 354 873 B 1 | 2/1990 | (EP) . |
| 0 363 722 B 2 | 4/1990 | (EP) . |
| 532 949 A 1 | 3/1993 | (EP) . |
| 2 205 300 B | 7/1988 | (GB) . |
| 62-244832 | * 10/1987 | (JP) .................................. 414/996.9 |

OTHER PUBLICATIONS

German Search Report dated: Jun. 2, 1997; and.
Article: Titled—Sheet process lines . . . 17 Ways to Track the Edge, S.L. Sorsen Industrial Controls Div., General Precison Inc.; Dated: May 1964.
Optisch–elektronische Kontroll–und Steuergeräte für die Verarbeitung von Papier, Pappe und Wellpappe, Von Ing. (grad.) Volker Giessler, Emmendingen May 1969.

* cited by examiner

Primary Examiner—Janice L. Krizek
(74) Attorney, Agent, or Firm—Venable; George H. Spencer; Robert Kinberg (57) ABSTRACT

Successive palletized stacks of blanks in a layer of such stacks on a penetrable support of cardboard or the like are lifted off the support by a substantially horizontal plate- or blade-like implement which is caused to penetrate between the upper side of the support and the underside of a selected stack prior to lifting of the selected stack off the support for transfer onto a conveyor or into a blank converting machine, such as a cigarette packing machine. An optical or other suitable monitoring unit has one or more sensors carried by the implement such that they share the movements of the implement to detect, and to effect the generation of defect signals in response to the detection of, improper operation of the apparatus, such as the penetration of the implement through and subsequent lifting of a portion of the support with a selected stack.

6 Claims, 3 Drawing Sheets

METHOD AND APPARATUS FOR DEPALLETIZING COMMODITIES

BACKGROUND OF THE INVENTION

The invention relates to improvements in methods of an in apparatus for temporarily storing commodities and for removing, when necessary, commodities from storage. More particularly, the invention relates to improvements in methods of and in apparatus for removing (depalletizing) commodities from temporary storage facilities in the form of pallets. Typical examples of commodities which can be manipulated in accordance with the improved method and with or by the improved apparatus are stacks of superimposed articles, e.g., flat or substantially flat blanks of paper, cardboard, plastic material and/or metallic foil which are designed for conversion into containers or receptacles (such as packets) for arrays of plain or filter cigarettes or other articles or products of the tobacco processing industry. Still more particularly, the invention relates to improvements in methods of and in apparatus for depalletizing commodities which are temporarily deposited on normally at least slightly deformable and/or penetrable supports in the form of sheets, tarpaulins or panels which are placed between superimposed layers of commodities on pallets or analogous conveyances.

Depalletizing apparatus of the category of apparatus to which the present invention pertains are disclosed in European patents Nos. 0 532 949 A1, 0 363 722 B2 and 0 354 873 B1. The patented apparatus are designed to singularize accumulations of blanks which are stacked on pallets and are to be fed to packing machines, such as cigarette packing machines, for conversion into portions of or into entire packets, e.g., into packets each of which is dimensioned and configurated to accept and confine an array of twenty plain or filter cigarettes in the customary quincunx formation.

A modern high-speed cigarette packing machine (or another blank processing or converting machine) is designed to turn out huge quantities of packaged products per unit of time. Thus, even a relatively short interruption of the feed of blanks to such a machine can entail enormous losses in output. Therefore, such machines are often combined with a conveyor system which employs mobile pallets capable of temporarily storing numerous stacks of superimposed blanks, preferably in a distribution to afford convenient access to the stacks in a given sequence and unimpeded transfer into one or more blank-receiving magazines of a packing machine.

As mentioned above, it is already known to employ pallets which are designed to temporarily receive and transport large numbers of stacks of superimposed blanks made of paper, cardboard and/or other material or materials, often in the form of several superimposed layers which are separated from each other by sheet-like or analogous supports and each of which can contain a plurality (e.g., several dozens) of coplanar stacks. For example, the supports between neighboring superimposed layers of stacks of paper or cardboard blanks can be made of cardboard or a sheet- or panel-like material of similar consistency, and a pallet can support a substantial number of layers with supports (e.g., six cardboard panels) between neighboring layers.

Certain presently known depalletizing apparatus employ a tool or implement which is movable in several directions so that it can be caused to penetrate between the upper side of a topmost (or the only) support and the underside of a selected stack on such topmost or only support. The next step involves a lifting of the selected stack above and away from the upper side of the support and the transfer of the thus lifted stack onto a suitable conveyor which delivers the stacks into the blank-receiving magazine of a packing machine. As a rule, and in order to facilitate and simplify the introduction of the implement between the upper side of a support and the underside of a selected stack on such support, the implement is borne by a drive which can move the implement in the direction of the X, Y and Z axes, namely up and down (Z axis) as well as in a horizontal plane in two directions (X and Y axes) extending at right angles to each other. Once the implement has been moved to a required level (at the upper side of a support), it is moved in the direction of the X or Y axis to penetrate between the upper side of the support and the underside of the lowermost blank in a selected stack.

Problems arise when the upper side of a support is not smooth or is not flat or is slotted or otherwise damaged (e.g., as a result of repeated use) so that the normally sharp or reasonably sharp leading edge of the implement penetrates into and thereupon lifts a portion of the support together with a selected stack above it. This can result in undesirable shifting of one or more neighboring stacks on the partially lifted support and/or in at least some undesirable shifting (or complete collapse) of the stack overlying the implement. In either event, the transfer of stacks from the pallet must be interrupted for a certain interval of time to permit for manual separation of the implement from the lifted portion of the support as well as for the reestablishment of orderly distribution, orientation and configuration of neighboring stacks. This can entail huge losses in output, especially if the impaling and lifting of a portion of a support is detected with a certain delay. In many instances, an irregularity in the depalletizing operation can be remedied only upon stoppage of an entire production line, e.g., a production line embodying one or more cigarette rod makers, one or more filter tipping machines and one or more packing machines.

OBJECTS OF THE INVENTION

An object of the invention is to provide a novel and improved method of depalletizing stacks of superimposed blanks or other types of commodities in such a way that losses attributable to improper removal of a commodity are reduced to a minimum.

Another object of the invention is to provide a method which can be practiced with apparatus constituting relatively minor but ingenious departures from conventional depalletizing apparatus.

A further object of the invention is to provide a method which, though especially suitable for the practice in connection with the manipulation of paper, cardboard or other blanks which are to be converted into packets or other types of receptacles or containers for smokers' products, can be resorted to with equal or similar advantage for the depalletizing of many other types of commodities which are to be manipulated in a highly predictable fashion and with a minimum of supervision by and/or assistance from attendants.

An additional object of the invention is to provide a novel and improved depalletizing method which can be practiced by resorting to simple, compact and relatively inexpensive apparatus for predictable removal of commodities from available pallets and/or supports.

Still another object of the invention is to provide a novel and improved apparatus for the practice of the above outlined method.

A further object of the invention is to provide the apparatus with novel and improved means for rapidly and reliably detecting irregularities in the depalletizing of stacks of blanks or other types of commodities.

Another object of the invention is to provide a machine which employs one or more depalletizing apparatus exhibiting the above outlined features and advantages.

An additional object of the invention is to provide a novel and improved combination of a mobile commodity manipulating implement, means for moving the implement relative to commodities on a pallet, and means for detecting and indicating the detection of irregularities in the depalletizing of commodities.

Still another object of the invention is to provide novel and improved methods and apparatus for feeding accumulations of paper, cardboard or other blanks to one or more packing machines, particularly to one or more machines for packing arrays of plain or filter cigarettes or other smokers' products.

A further object of the invention is to provide a depalletizing apparatus which requires less attention on the part of one or more attendants than heretofore known depalletizing apparatus.

Another object of the invention is to provide an apparatus which is constructed, assembled and adapted to be operated in such a way that the departures, if any, of its operation from an optimum mode of operation can be remedied or eliminated within shorter intervals of time than those of conventional apparatus, such as those disclosed in the above-enumerated European patents.

SUMMARY OF THE INVENTION

One feature of the present invention resides in the provision of a method of removing a commodity (such as a stack of paper blanks or the like) from the upper side of a support by means of an apparatus which includes a substantially horizontal lifting implement movable in a plurality of directions including downwardly toward, upwardly away from and along the upper side of the support. The improved method comprises the steps of introducing the implement between the commodity and the upper side of the support, monitoring the position of at least one of the implement, the support and the commodity not later than upon completion of the introducing step and generating a signal at least when the monitored position departs from a predetermined position, and moving the implement and the commodity relative to and away from the support at least when the monitoring step does not result in the generation of a signal denoting that the monitored position departs from the predetermined position.

As already mentioned above, the commodity can comprise at least one stack of superimposed substantially flat blanks of paper, cardboard, plastic material, metallic foil and/or others.

The monitoring step can be carried out at least in the course of the introducing step or upon completion of the introducing step.

The signal which is generated in the course of the monitoring step can constitute a defect signal, and such method can further comprise the step of blocking the moving step in response to the generation of a defect signal. Such method can further comprise the step of correcting (e.g., manually) the monitored position in response to the generation of a defect signal.

The introducing step can include moving the implement downwardly at least close to the upper side of the support adjacent the commodity to be lifted off the support, and thereupon advancing the implement along the upper side of the support to cause the implement to enter between such upper side and the underside of the commodity.

The method can further comprise the step of lifting at least a portion of the implement and at least a portion of the commodity above and normally away from the upper side of the support subsequent to the introducing step and prior to or simultaneously with the monitoring step. The monitoring step preferably includes monitoring the position of the support. The signal can be generated when the monitoring step reveals a lifting of at least a portion of the support with the portions of the commodity and the implement. The aforementioned lifting step can include lifting or raising portions of the commodity and of the implement through a distance in the range of several millimeters, e.g., in the range of approximately 10 mm.

The monitoring step can include optically scanning the position of the support. Alternatively or in addition to optical scanning, the monitoring step can include mechanically, hydraulically or pneumatically scanning the position of the support.

Another feature of the invention resides in the provision of an apparatus for removing commodities from the upper side of a support. The improved apparatus comprises a displacing unit including a substantially horizontal lifting implement and means for moving the implement in a plurality of directions including downwardly toward, upwardly away from and along the upper side of the support so that the implement can be introduced between the upper side of the support and a selected commodity at such upper side, means for monitoring the position of at least one of the implement, the support and the selected commodity not later than upon completion of introduction of the implement between the upper side of the support and the underside of the selected commodity including means for generating signals denoting the monitored position, and means for evaluating such signals.

The means for generating signals can be arranged to generate defect signals when the monitored position of the implement and/or selected commodity and/or support departs from a predetermined position, and the moving means is preferably operative to move the implement and the selected commodity away from the upper side of the support at least in the absence of generation of a defect signal.

In accordance with a presently preferred embodiment of the invention, the monitoring means preferably includes means for monitoring the position of the support. Such monitoring means can comprise a position sensor which is carried by the moving means and extends toward the upper side of the support. The arrangement can be such that the signals denote the position of that portion of the support which is located beneath the implement or beneath a portion of the implement if the latter is permitted or caused to penetrate into and through the support.

The monitoring means can include an optical sensor for the position of the support, and such sensor is preferably borne by the moving means for the implement. The material and/or the coating of the support can be selected in such a way that its upper side reflects radiation, and the optical sensor can include a source of radiation and means for directing radiation from such source against the upper side of the support. The signal generating means of such monitoring means is operative to generate signals denoting at least one characteristic (e.g., the intensity) of radiation which is being reflected by the upper side of the support.

The moving means can include means for moving at least a portion of the implement and at least a portion of the selected commodity upwardly to predetermined positions subsequent to introduction of the implement between the upper side of the support and the underside of the selected commodity, and the monitoring means of such apparatus can comprise means for monitoring the position of the support in such predetermined positions of the portion of the implement and portion of the selected commodity. The signal generating means of such monitoring means is preferably arranged to transmit to the evaluating means a signal denoting the monitored position of the support in the predetermined positions of the portions of the implement and the selected commodity.

The monitoring means is preferably borne by the means for moving the implement and can include a mechanical and/or a fluid-operated (hydraulic or pneumatic) sensor which constitutes or forms part of the signal generating means. The fluid-operated sensor can include a dynamic pressure transducer.

The novel features which are considered as characteristic of the invention are set forth in particular in the appended claims. The improved apparatus itself, however, both as to its construction and its mode of operation, together with numerous additional important and advantageous features thereof, will be best understood upon perusal of the following detailed description of certain presently preferred specific embodiments with reference to the accompanying drawings.

DESCRIPTION OF PREFERRED EMBODIMENTS

Figure 1:
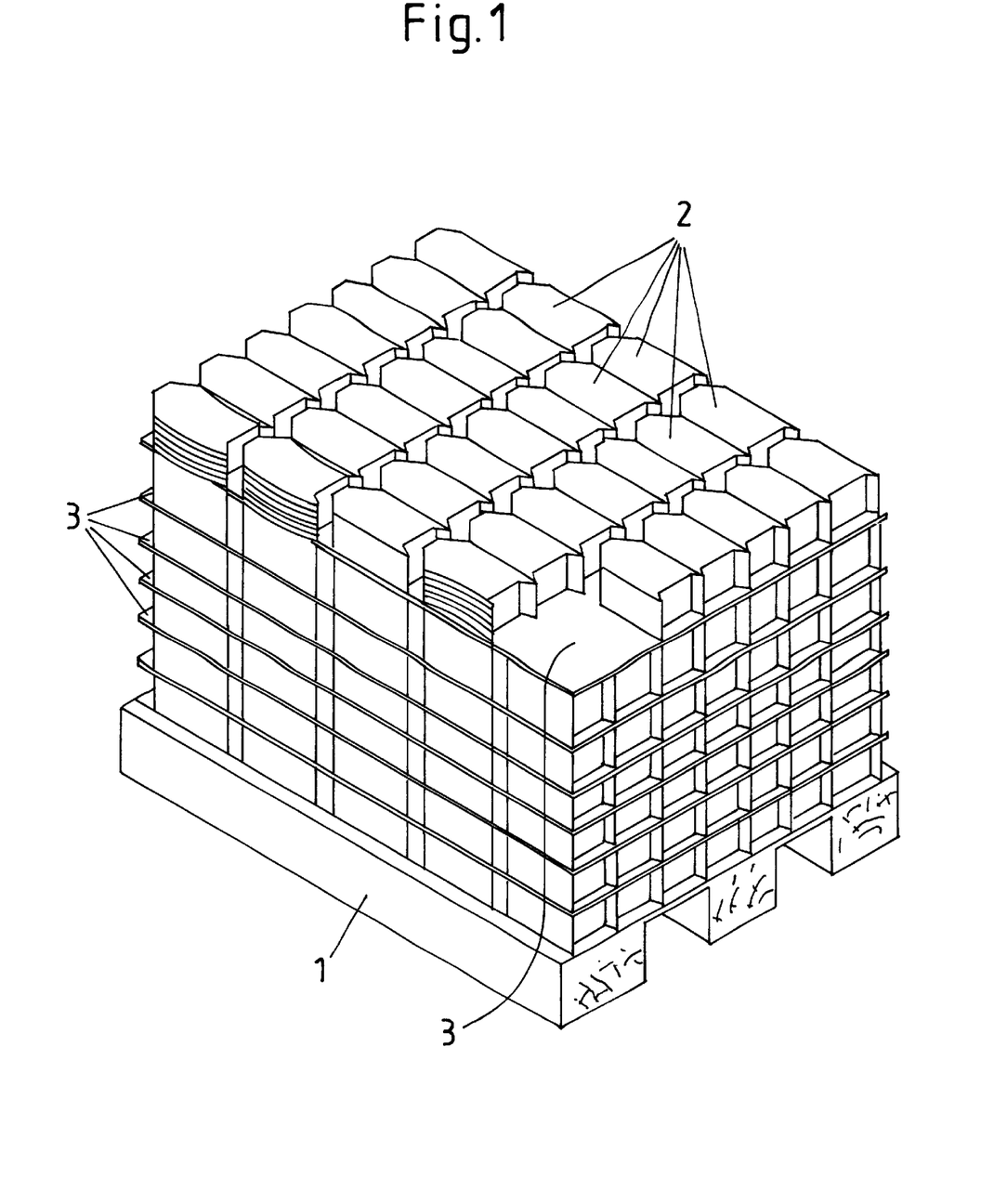
FIG. 1 is a perspective view of a pallet for temporary storage of superimposed layers of commodities with the neighboring layers separated from each other by sheet-like supports of cardboard or the like in a manner for depalletizing in accordance with the method and by resorting to the apparatus of the present invention.

FIG. 1 shows a standard pallet 1 which carries an array of block-shaped commodities 2, e.g., stacks of superimposed at least substantially flat blanks of paper, cardboard and/or other suitable material. The blanks can be designed for conversion into packets for plain or filter cigarettes if the pallet 1 is utilized in a production line to temporarily store commodities 2 (hereinafter called stacks for short) which are to be transferred into the magazine(s) of one or more packing machines for rod-shaped articles of the tobacco processing industry. However, it is to be understood that the method and apparatus of the present invention can be utilized for the manipulation (depalletizing) of other types of commodities in machines or production lines which may but need not necessarily be utilized in the tobacco processing industry.

The stacks 2 are arranged in several horizontal layers, and each such layer rests on a sheet- or panel-like support 3, e.g., a support made of cardboard or the like. The number of supports 3, the number of layers of stacks 2, and the number of stacks 2 in each layer can depart from those shown in FIG. 1. The manner in which the palllet 1 can be loaded with layers of stacks 2 and with supports 3 and/or the manner of transporting the pallets to and from a depalletizing station form no part of the present invention. The neighboring stacks 2 in the longitudinally and/or transversely extending rows of stacks in a layer may but need not actually abut each other. FIG. 1 shows that the longer sides of neighboring stacks 2 in a layer are closely adjacent or actually abut each other but the shorter sides of neighboring stacks are spaced apart from one another.

The purpose of the supports 3 is to stabilize the layers of stacks 2 as well as to stabilize the entire (multi-layer) accumulation of stacks on the pallet 1.

Figure 2:
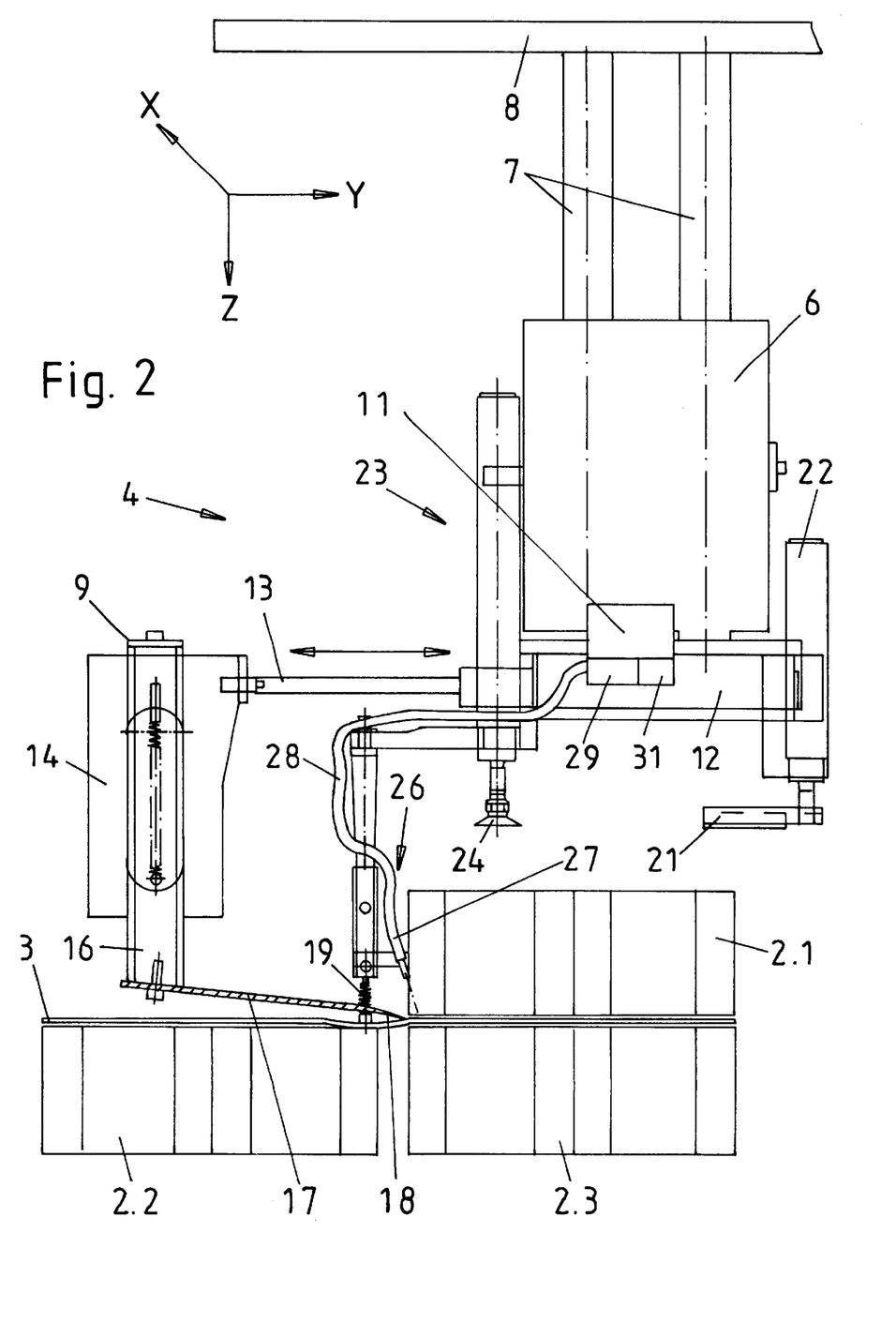
FIG. 2 is an elevational view of an apparatus which embodies one form of the present invention and wherein the lifting implement is held in a position preparatory to penetration between the upper side of a support and the underside of a selected commodity.

One presently preferred apparatus (4) for depalletizing accumulations of stacks 2 of the type shown in FIG. 1 is illustrated in FIG. 2. The lower part of FIG. 2 shows a portion of a single support 3 (such as the topmost support on the pallet 1 of FIG. 1) and three stacks 2.1, 2.2 and 2.3. The stack 2.1 can be said to constitute a selected stack or commodity because it is about to be lifted off the upper side of the support 3. The support 3 of FIG. 2 is removed as soon as the last stack (such as 2.1) at the upper side of this support is removed by the improved apparatus 4. The stacks 2.2 and 2.3 (and all other stacks in the layer including the stacks 2.2, 2.3) are then ready to be depalletized in the same way as will be described hereinafter in connection with the removal of the selected stack 2.1.

The apparatus 4 comprises a stack displacing unit which includes a substantially horizontal plate-like lifting implement 17 (hereinafter called plate for short) and means for moving the plate 17 in a plurality of directions (indicated by the arrows X, Y and Z). The movements of the plate 17 include movements downwardly toward (arrow Z) and upwardly away from the upper side of the support 3, as well as back-and-forth movements in several (such as two) directions (arrows X and Y) in at least substantial parallelism with the upper side of the support 3. Such movability of the plate 17 renders it possible to (automatically or manually) move (arrow Z) the preferably thin (and hence relatively sharp) leading edge 18 of the plate into actual contact with or close to the upper side of the support 3 and to thereupon move the plate 17 in the direction of the arrow X and/or Y in order to locate the leading edge 18 adjacent one side of the selected stack 2.1. When such preliminary positioning of the plate 17 is completed, the plate is ready to be moved along the upper side of the support 3 so that its leading edge 18 is introduced between such upper side and the underside of the lowermost blank of the selected stack 2.1 (see FIG. 3).

The aforementioned means for moving the plate 17 in and counter to the directions indicated by the arrows X, Y and Z includes a carrier or head 6 which is movable up and down (arrow Z) along upright guides 7. The upright guides 7 are movable back and forth (arrow Y) along horizontal paths relative to a first track 8, and the track 8 is movable horizontally (arrow X) along a further or second track (not shown), namely along a path which is or can be exactly normal to the horizontal paths for the upright guides 7 along the first track 8. Thus, the leading edge 18 of the plate 17 can be moved downwardly toward and upwardly away from the upper side of the support 3 of FIGS. 2 and 3 by causing the carrier 6 to move along the upright guides 7, and the leading edge 18 can also be moved along the upper side of the support 3 by moving the guides 7 relative to the track 8 and/or by moving the guides 7 and the track 8 relative to the non-illustrated second track. The means for moving the carrier 6 relative to the guides 7, the guides 7 relative to the first track 8, and the track 8 relative to the second track can comprise fluid-operated motors, electric motors or any other suitable prime movers the exact design of which forms no part of the present invention. All that counts is to provide the displacing unit of the apparatus 4 with moving means which can advance the plate 17 downwardly toward and upwardly away from the upper side of the support 3 as well as along the upper side of the support 3 so that the leading edge 18 (and thereupon an additional (e.g., major) part of the plate) can be introduced between the support 3 and the underside of the lowermost blank in the selected stack 2.1.

The displacing unit of the apparatus 4 can be provided with one or more sensors which track the movements of the plate 17 relative to the upper side of the support 3 and transmit appropriate signals to an evaluating circuit 31 of the apparatus 4. For example, a position sensor can be provided to generate signals denoting the exact or approximate position of the carrier 6 relative to the upright guides 7, i.e., to indicate the level of the leading edge 18 of the plate 17 relative to the upper side of the support 3. Such signals can be utilized to decelerate the prime mover for the carrier 6 when the leading edge 18 has been moved to a level close to the desired or optimum level relative to the upper side of the support 3.

Figure 3:
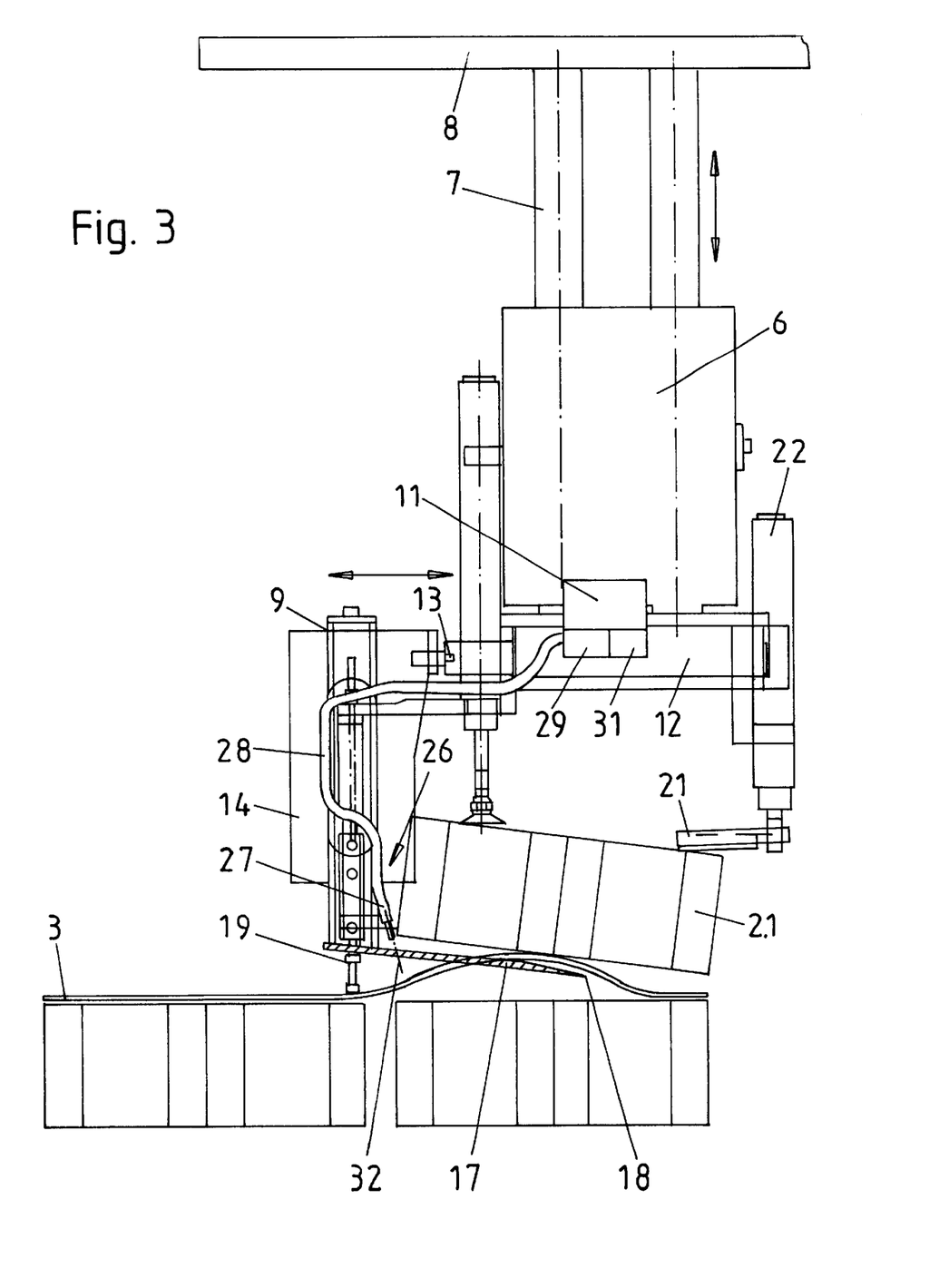
FIG. 3 is a similar elevational view but showing the implement and the selected commodity in partially lifted positions, and further showing a portion of the support in an improper position which the support assumes as a result of traversal by the relatively sharp leading edge of the implement.

The carrier 6 movably or fixedly supports a substantially horizontal guide 12 for one or more reciprocable rod-like guides 13 the free end portion(s) of which carries or carry an upright guide 14 vertically movably mounting the trailing portion of the plate 17. Such trailing portion of the plate 17 is secured to a holder 16, e.g., by one or more threaded fasteners. As can be seen in FIGS. 2 and 3, the plate 17 (which resembles or can resemble a flat tongue with a sharp edge 18) can slope downwardly through a relatively small acute angle in a direction from the holder 16 toward the upper side of the support 3. This renders it possible to move the leading edge 18 into actual contact with the upper side of the support 3 adjacent one side of the selected stack 2.1 while the major part of the underside of the plate 18 remains spaced apart from the upper side of such support. Reference may be had to the aforementioned European patent No. 0 532 943 A1 which describes and shows a plate suitable for use in the apparatus 4 of the present invention.

The holder 16 can be said to constitute an extension of the carrier 6 and serves to ensure a highly accurate selection of the level of the leading edge 18 of the plate 17 relative to the upper side of the support 3 before the plate 17 is caused to move along the upper side of the support from the position of FIG. 2 to that which is shown in FIG. 3. The vertical guide 14 at the free end(s) of the rod-like guide(s) 13 carries a suitable prime mover (not specifically shown) which can move the holder 16 and the plate 17 up and down for the aforementioned purpose of selecting the exact level of the leading edge 18 with a very high degree of accuracy.

A sensor 9 is provided on the holder 16 to transmit (to the evaluating circuit 31) signals denoting the exact level of the holder 16 and plate 17 relative to the guide 14. A further sensor 11 is provided to transmit signals denoting the exact position of the guide 14, holder 16 and plate 17 in the longitudinal direction of the guide(s) 13, i.e., in or counter to the direction indicated by the arrow Y. Additional sensor or sensors are or can be provided to generate and to transmit to the evaluating circuit 31 additional signals denoting the exact position of the plate 17 as seen in and/or counter to the direction indicated by the arrow X and/or Y and/or Z. All this contributes to a more accurate positioning of the leading edge 18 relative to the upper side of the support 3 and/or relative to the selected stack 2.1. The evaluating circuit 31 is or can be designed to control or regulate the operation of various prime movers for the carrier 6, for the first track 8, for the second track, and for the holder 16.

The guide 12 and the guide(s) 13 can include or constitute one or more fluid-operated (hydraulic or pneumatic) motors (e.g., one or more double-acting cylinder and piston units) which can move the guide 14 toward and away from the carrier 6 in response to actuation (by the evaluating circuit 31) of one or more valves serving to regulate the flow of a fluid medium into and from the cylinder chamber or chambers of such motor(s). Analogously, the guide 14 can include or constitute a fluid-operated motor which can move the holder 16 (or directly the plate 17) to a desired level relative to the upper side of the support 3.

It is also possible to employ an electric motor (not shown) in order to shift the guides 13, 14 relative to the guide 12 on the carrier 6. Such prime mover can further enhance the accuracy of adjustment of the position of the leading edge 18 of the plate 17 relative to the selected stack 2.1.

In order to facilitate the introduction of the leading edge 18 of the plate 17 between the upper side of the support 3 and the underside of the lowermost blank of the selected stack 2.1, i.e., a movement of the plate 17 from the position of FIG. 2 to the position of FIG. 3, the carrier 6 supports at least one but preferably two hold-down devices 19 (only one shown) which flank the plate 17 at the leading edge 18 and can be caused to bear against the upper side of the support 3 at least when the leading edge 18 reaches the position of readiness for advancement beneath the lowermost blank of the selected stack 2.1. The construction and the mode of operation or manipulation of the carrier 6 and of the hold-down device or devices 19 can be the same as described in the aforementioned European patent No. 0 532 949 A1 to which reference may be had if necessary.

A further hold-down device 21 which is supported by the carrier 6 serves to prevent deformation of the selected stack 2.1 during lifting of such stack by the plate 17. The hold-down device 21 is movable up and down by a suitable drive 22 which is also mounted on and thus shares the movements of the carrier 6. When the selected stack 2.1 is engaged from below by the upper side of plate 17, the upper side of the topmost blank of such stack is engaged by the hold-down device 21 so that the configuration of the stack 2.1 remains at least substantially unchanged during subsequent lifting above and movement away from the support 3, e.g., for the purpose of depositing the stack 2.1 in or on a suitable conveyor for delivery to a packing machine or for introduction of the stack 2.1 directly into the blank-receiving magazine of a packing machine.

The carrier 6 further supports a blank removing device 23 having at its lower end at least one suction cup 24 or another suitable blank attracting or lifting component which is put to use, when necessary, to remove from the upper side of the support 3 one or more blanks which remained on the support subsequent to removal of all stacks or a particular stack (such as 2.1). For example, and assuming that the leading edge 18 of the plate 17 failed to penetrate between the upper side of the support 3 and the underside of the lowermost blank of the selected stack 2.1 shown in FIGS. 2 and 3, the blank or blanks which remained on the support 3 upon removal (depalletizing) of the major portion of the stack 2.1 can be gathered and removed by the suction head 24. The upper portion of the blank removing device 23 can include or constitute a prime mover (e.g., a fluid-operated motor) which can change the level of the suction cup 24 relative to the carrier 6. Such movability of the suction cup 24 relative to the carrier 6, combined with the movability of the carrier in and counter to the directions indicated by the arrows X, Y and Z, suffices to ensure that the suction cup 24 can reach and remove blanks on any given portion of the upper side of the support 3.

In addition to its just described function of gathering discrete blanks off the upper side of the support 3, the device 23 can perform the function of assisting or replacing the hold-down device 21, i.e., of causing the suction cup 24 to bear upon the upper side of the topmost blank of a stack (such as 2.1) which is to be removed from the support 3. The arrangement can be such that, as a rule, the suction head 24 is used as a hold-down device; however, if one or more blanks happen to remain on a support upon depalletizing of a complete layer of stacks, or upon removal of a particular stack, the device 23 can be put to use as a means for gathering and removing such stray blank or blanks. This might be desirable for several reasons, i.e., to prevent a loose blank from interfering with the advancement of the leading edge 18 of the plate 17 along the upper side of a support 3 to a desired (optimum) position and/or to ensure that a support which has been relieved of the respective layer of stacks can be readily removed and immediately put to renewed use in conjunction with the same pallet or with another pallet.

In accordance with an important feature of the invention, the apparatus 4 further comprises a unit 26 which serves as a means for monitoring the position of the plate 17, of a selected stack (such as 2.1) and/or of the support 3 not later than when the step of introducing the leading edge 18 of the plate 17 between the upper side of the support 3 and the underside of the selected stack is completed. The monitoring unit 26 comprises means 29 for generating signals which denote the monitored position of the plate 17, selected stack and/or support 3 and for transmitting such signals to the evaluating circuit 31. The purpose of the monitoring unit 26 and of its signal generating means 29 is to generate defect signals when the actual introduction of the plate 17 between the upper side of the support 3 and the underside of a selected stack (2.1) departs from a desirable or optimum introduction.

For example, and as shown in FIG. 3, the just completed introduction of the leading edge 18 of the plate 17 beneath the stack 2.1 was unsatisfactory because the leading edge 18 has been caused to penetrate through the adjacent portion of the support 3 and the latter actually overlies such leading edge. In other words, the leading edge 18 is located at the underside, in lieu of at the upper side, of the support 3.

The monitoring unit 26 is designed to monitor the position of that portion of the support 3 which is adjacent the plate 17 when the aforediscussed introducing step is completed. To this end, the unit 26 comprises an optical position sensor including a source of radiation 32 (such as light). The source includes or is adjacent the upper end of a light conductor 28 having a radiation discharging/receiving end 27 serving to direct at least one beam of radiation 32 toward the upper side of (e.g., through a window in) the plate 17. The radiation which is reflected back into the conductor 28 is transmitted to the signal generating means 29 which generates a defect signal (under the circumstances prevailing in FIG. 3) or a signal denoting that the plate-introducing step has been completed in a satisfactory manner, i.e., that the partially lifted selected stack can be moved off and away from the upper side of the support 3 to be delivered to a conveyor or into a magazine for blanks.

The actual radiation source can be installed in or can form part of the signal generating means 29. Thus, a beam of radiation 32 can issue from the source of the signal generating means 29 to be propagated in the conductor 28, to issue at the end 27, to be reflected by the support 3 back into the end 27, and to be propagated in the conductor 28 back to the signal generating means 29 which generates a signal denoting the position (level) of that portion of the support 3 which is adjacent the plate 17. The manner in which a signal generating means (29) can emit radiation and can be provided with a suitable transducer for the generation and transmission (to the evaluating circuit 31) of signals which are indicative of the monitoring of the position of the support 3 at the plate 17 is well known to those skilled in the relevant arts.

As already mentioned above, the evaluating circuit 31 receives and processes several additional signals including those transmitted by the sensors 9 and 11 (as well as by one or more additional sensors, if any). The evaluating circuit 31 is shown as a discrete component part of the apparatus 4; however, it is often preferred to integrate the evaluating circuit 31 into the control circuitry of the machine or production line in which or in conjunction with which the apparatus 4 is being put to use.

The operation of the apparatus 4 is as follows:

It is assumed that the apparatus is to lift the selected stack 2.1 of FIG. 2 off the upper side of the support 3. The first step involves the positioning of the carrier 6 relative to the upright guides (arrow Z), the guides 7 relative to the first track 8 (arrow Y) and the first track 8 relative to the second track (arrow X), as well as the holder 16 (by way of the parts 12, 13, 14) relative to the carrier 6 and holder 14, in such a way that the leading edge 18 of the plate 17 assumes a desired position relative to the selected stack 2.1 Thus, and as shown in FIG. 2, the leading edge 18 is closely adjacent the upper side of the support 3 at a locus closely or immediately adjacent the nearest edge of the lowermost blank of the stack 2.1. The hold-down devices 19 are operative, i.e., they are caused to depress the adjacent portions of the support 3 so that the leading edge 18 is even more likely to penetrate between the upper side of the support 3 and the underside of the lowermost blank forming part of the selected stack 2.1.

Alternatively, the leading edge 18 of the plate 17 can be moved to the position of FIG. 2 in two successive stages. The first stage can involve a coarse adjustment by the carrier 6 (arrows X, Y, Z) and holder 16 (via guides 12, 13, 14) so that the leading edge 18 is moved to a position reasonably close to the desired or optimum position for penetration between the support 3 and the stack 2.1. The next-following second stage involves a precision or final adjustment of the position of the leading edge 18, e.g., with assistance from one or more sensors (not shown) at or close to the hold-down devices 19. Such sensor or sensors can generate signals which are evaluated by the circuit 31 and are utilized to effect final adjustments of the leading edge 18 (i.e., of the plate 17) in the directions of the arrows X and Y. Moreover, a signal from the sensor 9 can be utilized to thereupon move the holder 16 and the plate 17 relative to the guide 14 (arrow Z) so that the leading edge 18 is immediately adjacent or actually contacts the upper side of the support 3 at the hold-down devices 19.

The movement of the holder 16 and plate 17 relative to the guide 14 is terminated when the signal from the sensor 9 to the evaluating circuit 31 indicates that the leading edge 18 is located at an optimum level relative to the upper side of the support 3. That position of the leading edge 18 which is shown in FIG. 2 is presumed to be an optimum position, i.e., a position which is least likely to cause any problems in the course of the next-following steps which normally involve the introduction of an adequate portion of the plate 17 between the support 3 and the stack 2.1, lifting of the plate 17 and of the stack 2.1 above and away from the support 3, and the transfer of the stack 2.1 from the plate 17 onto a conveyor, into a magazine or to another destination.

The movement of the plate 17 from the position of FIG. 2 to the position of FIG. 3 is effected by moving the guides 13 and 14 (with the holder 16) relative to the guide 12 and/or by moving the upright guides 7 along the first track 8. Thus, the movement of the plate 17 from the position of FIG. 2 to the position of FIG. 3 takes place along a horizontal path defined by the guide(s) 13. If the leading edge 18 encounters an obstruction, such as an upwardly projecting portion of the support 3, the plate 17 penetrates into and through the relatively thin support in a manner as shown in FIG. 3 so that the leading edge 18 is located beneath (rather than at a level above) the adjacent portion of the support. For example, a portion of the support 3 beneath the selected stack 2.1 (above the stack 2.3) can be caused to bulge upwardly as a result of the action of the hold-down devices 19 in combination with frictional engagement between the leading edge 18 and the upper side of the support 3. The leading edge 18 is caused to cut an elongated slot in the support 3 on its way to the position which is shown in FIG. 3.

If the undesirable penetration of the plate 17 through the support 3 is not detected in time, i.e., if the plate 17 is thereupon caused to move upwardly in order to advance the stack 2.1 above and away from the stack 2.3, the plate 17 lifts and ultimately tears up that portion of the support which overlies the plate. If the stack 2.1 is not the last stack of the layer of, for example, thirtyfive stacks (see FIG. 1) on the support 3 of FIG. 3, at least some of the stacks adjacent the stack 2.1 are overturned, partially overturned or otherwise affected so that they are no longer in conditions for predictable depalletizing. Each such occurrence necessitates a lengthy interruption of the depalletizing operation in order to enable one or more attendants to remove all affected stacks before the plate 17 can be caused to resume the removal of remaining stacks off the pierced support 3 or off the next-following (lower) support.

In order to ensure timely detection of a less than satisfactory operation of the apparatus 4, each depalletizing operation preferably includes the additional step which is shown in FIG. 3. Thus, prior to actually removing a stack (2.1) which at least partially overlies the plate 17, the latter is moved upwardly through a pre-determined distance (e.g., in the range of one or more millimeters, preferably about 10 mm) to lift the stack 2.1 and to enable the monitoring unit 26 to even more reliably and accurately ascertain whether or not the monitored part of the support 3 at the plate 17 is in a position which is indicative of satisfactory lifting of the stack 2.1 above and away from the support. The plate 17 can be lifted by the carrier 6 which is caused to move upwardly (counter to the direction indicated by the arrow Z) along the upright guides 7 and thus lifts the plate 17 by way of the guides 12, 13, 14 and holder 16.

The monitoring unit 26 is caused to ascertain the position (and hence the condition) of the support 3 at the plate 17 as soon as the upward movement of the plate 17 through the distance of a few millimeters is completed. The beam of radiation 32 issuing from the signal generating means 29 passes through the plate 17 (e.g., via the aforementioned window in the plate) and is reflected by the raised portion of the support 3 beneath the plate 17. The thus reflected radiation causes the signal generating means 29 to generate a defect signal which is displayed or is rendered audible or is otherwise processed, e.g., by the evaluating circuit 31. A signal which is generated at 29 when the leading edge 18 did not penetrate through the support 3 in a manner as shown in FIG. 3 is sufficiently different from a defect signal to permit unimpeded continuation of the depalletizing operation.

The arrangement is preferably such that, if the signal generating means 29 transmits to the evaluating circuit 31 a defect signal, the circuit 31 prevents any further movements of the plate 17 and of the stack (2.1) thereon until the cause of malfunction (irregularity in the depalletizing operation) is detected and eliminated. In fact, a defect signal which is furnished by the signal generating means 29 and is processed by the evaluating circuit 31 can be utilized to effect a temporary stoppage of the machine or production line which receives stacks of blanks from the plate 17.

FIG. 3 illustrates only one of defective operations which can be detected by the monitoring unit 26 or an equivalent monitoring unit. Penetration of the leading edge 18 of the plate 17 into a support 3 of cardboard or the like has been illustrated in FIG. 3 because it is one of more frequent causes of malfunctioning of the depalletzing apparatus 4. The aforedescribed lifting of the plate 17 through a short distance prior to actual evacuation of the stack overlying the plate 17 constitutes an optional but highly desirable feature because it contributes to the reliability of detection of defective operation of the apparatus 4 and/or of flaws in a support 3 and/or of excessive resistance of the lowermost blank of a stack to separation from the upper side of the support below it so that the plate 17 is not compelled to damage or further damage or displace the support during advancement of the leading edge 18 from the position of FIG. 2 to that shown in FIG. 3.

The improved apparatus is susceptible of numerous additional modifications. For example, at least the conductor 28 of the optical detector forming part of the monitoring unit 26 can be mounted on one of the hold-down devices 19 or on the plate 17 or on the carrier 6. In fact, the signal generating means 29 can be mounted on one of the hold-down devices 19 or on the plate 17 or on the carrier 6 so that the conductor 28 can be dispensed with.

Furthermore, an optical monitoring unit 26 can be utilized in combination with or it can be replaced by a suitable mechanical or fluid-operated (pneumatic or hydraulic) monitoring unit. All that counts is to provide the apparatus 4 with a suitable monitoring unit capable of generating defect signals when a depalletizing operation is not being carried out in a prescribed or acceptable manner, e.g., when the leading edge 18 of the plate (implement) 17 has penetrated into the adjacent portion of a support.

The generation of a defect signal can be utilized to alert one or more attendants or to initiate an automatic remedial action, e.g., the transfer of one or more stacks into a collecting receptacle for waste material before the normal depalletizing operation is resumed.

In lieu of or in addition to monitoring of the support 3, the apparatus 4 can be equipped with means for monitoring the dimensions, the shape, the weight and/or other parameters or characteristics of successive stacks in order to ascertain whether or not the stacks are ready to be transported into a packing or other blank processing machine.

As concerns the various types of monitoring units which can be utilized in the apparatus of the present invention, reference may be had to any one of numerous available publications dealing with pneumatic, hydraulic, mechanical, optical and other sensors. For example, the part of the article by S. L. Sorsen on pages 77 and 79 in the May 1964 issue of the publication entitled "Control Engineering" describes and illustrates various modes of monitoring the quality, speed, position and height difference of sheets made of paper, steel, plastics and/or textile materials. The illustrations show the basic components (limit switches) of mechanical monitoring means, of light- or air-operated presence detectors, as well as of various proportional sensors. It is believed that a pneumatic proximity proportional sensor of the type shown and described at 10 on page 79 of the article by Sorsen is particularly suitable for use with or in lieu of the monitoring unit 26 shown in FIGS. 2–3. Such monitoring units, as well as numerous updated versions thereof, can be utilized with or as substitutes for the monitoring unit 26 of FIGS. 2–3 without departing from the spirit of the invention.

An advantage of the apparatus 4 which is shown in FIGS. 2 and 3 is that a defective depalletizing operation can be detected (and the necessary remedial steps undertaken) before a defective stack or a defect in the support affects the condition of other stacks on the same support.

Another important advantage of the improved method and apparatus is that a defective depalletizing operation can be detected immediately after occurrence so that a remedial action can be undertaken before the start of a chain reaction, i.e., of a series of two or more unsatisfactory depalletizing operations. This shortens the intervals of idleness of the blank processing machine and reduces the numbers of blanks or stacks of blanks which are damaged or otherwise affected as a result of a defective depalletizing operation. Thus, even a rather serious malfunction, such as that shown in FIG. 3, does not or need not cause substantial losses in output and/or damage to a large number of blanks.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of depalletizing commodities and, therefore, such adaptations should and are intended to be comprehended within the meaning and range of equivalence of the appended claims.

What is claimed is:

1. Apparatus for removing commodities from an upper side of a support, comprising a displacing unit including a substantially horizontal lifting implement;

means for moving said implement in a plurality of directions including downwardly toward, upwardly away from and along the upper side of the support so that the implement can be introduced between the upper side of the support and a selected commodity at the upper side;

means for monitoring the position of the support, and at least one of the implement and the selected commodity while the support is positioned between superimposed commodities, including means for generating signals denoting the monitored position, wherein said monitoring means comprises a position sensor carried by said moving means and extending toward the upper side of the support; and means for evaluating said signals.

2. The apparatus of claim 1, wherein said signals denote the position of the support beneath said implement.

3. The apparatus of claim 1, wherein the support is a flexible sheet and the monitoring means monitors flexing of the sheet.

4. Apparatus for removing commodities from an upper side of a support, comprising a displacing unit including a substantially horizontal lifting implement;

means for moving said implement in a plurality of directions including downwardly toward, upwardly away from and along the upper side of the support so that the implement can be introduced between the upper side of the support and a selected commodity at the upper side;

means for monitoring the position of the support, and at least one of the implement and the selected commodity while the support is positioned between superimposed commodities, including means for generating signals denoting the monitored position, wherein said monitoring means includes an optical sensor for detecting the position of the support, said sensor being borne by said moving means; and means for evaluating said signals.

5. The apparatus of claim 4, wherein the upper side of the support reflects radiation and said sensor includes a source of radiation and means for directing radiation from said source against the upper side of the support, said signal generating means being operative to generate signals denoting the characteristics of radiation being reflected by the upper side of the support.

6. The apparatus of claim 4, wherein the support is a flexible sheet and the monitoring means monitors flexing of the sheet.

* * * * *